United States Patent [19]

Kleine et al.

[11] 4,066,121

[45] Jan. 3, 1978

[54] HEAT EXCHANGER WITH HEADER HAVING IMPROVED FLUID DISTRIBUTION

[75] Inventors: Charles A. Kleine, Florissant, Mo.; Verne L. Middleton, East Alton, Ill.

[73] Assignee: Olin Corporation, New Haven, Conn.

[21] Appl. No.: 632,644

[22] Filed: Nov. 17, 1975

Related U.S. Application Data

[63] Continuation-in-part of Ser. No. 573,953, May 2, 1975, and Ser. No. 632,502, Nov. 17, 1975, which is a continuation-in-part of said Ser. No. 573,953.

[51] Int. Cl.² .......................... F28F 3/14; F28F 9/02; F24J 3/02
[52] U.S. Cl. .................................. 165/170; 126/271; 165/174
[58] Field of Search ................. 165/170, 174; 126/271

[56] References Cited

U.S. PATENT DOCUMENTS

| Re. 25,619 | 7/1964 | Adams | 165/170 |
|---|---|---|---|
| 1,124,740 | 1/1915 | Holt | 165/174 |
| 1,883,309 | 10/1932 | Lucke | 165/174 |
| 2,626,130 | 1/1953 | Raskin | 165/170 |
| 2,934,322 | 4/1960 | Hazard | 165/170 |
| 2,957,679 | 10/1960 | Campbell | 165/170 |

FOREIGN PATENT DOCUMENTS

| 329,140 | 2/1919 | Germany | 165/170 |
|---|---|---|---|
| 1,075,645 | 2/1960 | Germany | 62/523 |
| 485,095 | 9/1953 | Italy | 165/170 |
| 27,198 of | 1897 | United Kingdom | 165/174 |

*Primary Examiner*—Charles J. Myhre
*Assistant Examiner*—Sheldon Richter
*Attorney, Agent, or Firm*—Robert H. Bachman; Robert A. Dawson

[57] ABSTRACT

A heat exchanger having a desired system of tubular passageways for a heat exchange medium defining opposed headers connected by connecting portions of said passageways extending therebetween, said passageways having entry and exit portions extending from said headers to provide ingress and egress openings for said heat exchange medium, wherein said headers include a fluid distributing pattern comprising at least one bonded portion defining at least one wedge-shaped projection, said projection provided to assist in the distribution of flow of said heat exchange medium.

7 Claims, No Drawings

HEAT EXCHANGER WITH HEADER HAVING IMPROVED FLUID DISTRIBUTION

CROSS REFERENCE TO RELATED APPLICATION

The present application is a Continuation-In-Part of co-pending applications Ser. No. 573,953, filed May 2, 1975, and Ser. No. 632,502 filed of even date herewith, which is in turn a Continuation-In-Part of Ser. No. 573,953.

BACKGROUND OF THE INVENTION

The present invention relates to metal panels having a system of internal tubular passageways disposed between spaced apart portions of the thickness of the panel. Said panels possess utility in heat exchange applications wherein a heat exchange medium is circulated through said passageways. A particular application of said panels resides in devices utilizing solar energy, and specifically, solar energy absorbing devices for elevating fluid temperature.

It is well known that the radiation of the sun can be collected as a source of energy for heating or cooling or for direct conversion to electricity. Heating and cooling depend upon collection of rays of solar energy in a fluid heating transfer system. The heated fluid is pumped or allowed to flow to a place of utilization for the thermal energy it has acquired.

In certain areas of the world, solar energy is the most abundant form of available energy if it could be harnessed economically. Even in more developed areas of the world, the economic harnessing of solar energy would provide an attractive alternative to the use of fossil fuels for energy generation.

One of the problems attending the development of an efficient system for the conversion of solar energy resides with the structure and design of the solar energy absorbing device, or solar collector. This solar collector generally comprises a rectangular plate-like structure possessing channels or passageways for the circulation of the energy absorbing fluid medium. Conventionally, these panels have comprised a pair of opposed expanded passageways, known as headers, which are placed at opposite ends of the panel, and are connected by a plurality of tubular passageways which are often in parallel relation with respect to each other. These passageways, as well as the headers themselves, have generally been disposed at right angles with respect to each other and in parallel relation with respect to the horizontal and vertical dimensions, respectively, of the panel.

The aforementioned configuration suffers from certain deficiencies, in that fluid flow tends to encounter pockets of stagnation which cut down on the efficient circulation of solar energy. Further, as a partial result of the turbulent operating conditions attending heat exchange applications, various entrained gases tend to collect in the passageways, with the result that air locks which greatly inhibit flow and reduce the maximum fluid circulation capacity of the panel are often formed.

In our co-pending application Ser. No. 573,953, the disclosure of which is incorporated herein by reference, it was determined that improved flow was obtainable by a modification of the disposition of the headers wherein the headers define an angle of at least 91° with respect to the direction of flow of the heat exchange medium. Though this modification alleviates the aforenoted problems to an extent, it was felt that further improvement in flow was desirable in certain of the panel configurations. To this end the improvements embodied in the present invention were developed.

SUMMARY OF THE INVENTION

In accordance with the present invention, a heat exchanger is provided which possesses significantly improved efficiency, and specific utility in solar energy applications.

The panel of the present invention comprises a system of tubular passageways for a heat exchange medium defining opposed headers connected by connecting portions of said passageways extending therebetween, said passageways having entry and exit portions extending from said headers to provide ingress and egress opening for said heat exchange medium, wherein said headers include a fluid distributing pattern comprising at least one bonded portion defining at least one wedge-shaped projection, said projection provided to assist in the distribution of flow of said heat exchange medium.

In the preferred embodiment, the panel of the present invention comprises a system of internal tubular passageways for a heat exchange medium, said passageways disposed between spaced apart portions of the thickness of the panel to define opposed headers connected by connecting portions of said passageways extending therebetween. The internal passageways are provided with entry and exit portions extending from the headers to opposed edges of the panel in order to provide ingress and egress openings for the heat exchange medium.

The headers of the present invention include a fluid distributing pattern comprising at least one bonded portion defining at least one wedge-shaped projection, said projection provided to assist in the distribution of flow of said heat exchange medium. The headers may define an angle of at least 91°, and generally from 92° to 100° with respect to the direction of flow of said heat exchange medium as determined with respect to a longitudinal edge of said panel. The connecting portions of said passageways extend in said panel in a direction generally transverse to and interconnecting said headers, and may define an angle of at least 1°, and generally from 2° to 10° with respect to said longitudinal edge.

The headers of the present invention may possess a wide variation in the configuration of the fluid distributing pattern to account for variations in size and arrangement of the remaining elements of the respective panel. Thus, for example, the pattern may define a plurality of bonded portions possessing one or more projections in descending or cascading arrangement.

The panels of the present invention exhibit improved fluid flow control and directionality, as well as increased header strength, by the use of bonded portions provided in the headers, which define said wedge-shaped projections.

As indicated above, the preferred embodiment of the present invention utilizes a metal panel having a system of internal fluid passageways, conventionally painted black, as will be described in more detail hereinbelow. The concepts of the present invention may, however, also be advantageously utilized in heat exchangers generally, such as, for example, using extrusions. Since the concepts of the present invention are particularly advantageous in metal panels having a system of internal fluid passageways, the present invention will be specifically described hereinbelow utilizing this type of system.

Accordingly, it is a principal object of the present invention to provide a metal panel for use in heat exchange applications which enables the efficient and economical transfer of heat energy.

It is a further object of the present invention to provide a metal panel aforesaid which is particularly suited for use in a solar energy collector system.

It is yet a further object of the present invention to provide a metal panel as aforesaid which is efficiently designed to allow maximum utilization of internal passageway systems in a solar energy collector.

Further objects and advantages will become apparent to those skilled in the art as a detailed description proceeds with reference to the following drawings.

DETAILED DESCRIPTION

In accordance with the present invention, the foregoing objects and advantages are readily attained.

The panels of the present invention are provided with a flow distributing pattern in the headers comprising a part of the passageways thereof, wherein fluid flow is subdivided into discrete channels which are thereby capable of travel through said panel at higher rates of speed.

The present invention is directed to the problem of fluid blockage which results from the turbulent conditions under which the panels are operated. Specifically, the panels are conventionally situated in the vertical plane whereby the inlet opening is provided at the top edge thereof. Fluid enters at a rate accelerated by gravity and is then split into a plurality of channels to follow through the panel. A problem which has arisen in this arrangement is concerned with the turbulence of fluid movement through the inlet which results in a pressure drop as the fluid leaves the inlet and enters the expanded chamber of the header. This pressure drop causes air pockets to form and tends to impede the movement of fluid. To this end, the flow dividing pattern of the present invention provides the uniformity in volume and resistance to flow which prevents the development of the detrimental pressure differential.

Figure 1:
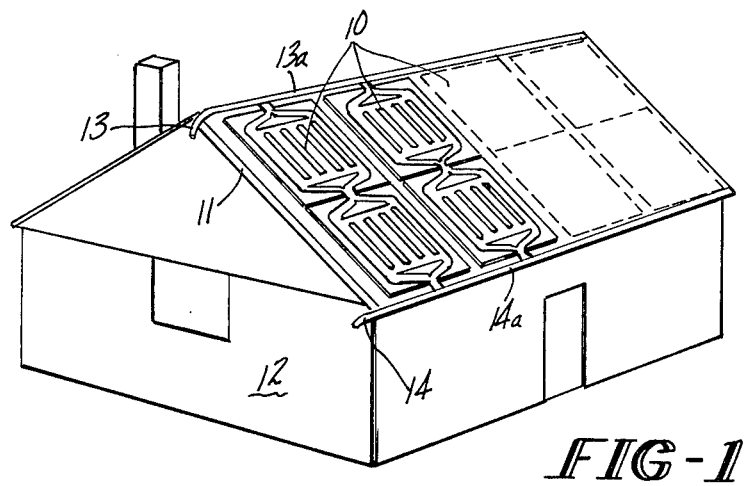
FIG. 1 is a diagram showing schematically the manner in which the panels of the present invention can be embodied.

The panels of the present invention are preferably utilized in a solar heating system as shown in FIG. 1 wherein a plurality of panels of the present invention 10 are mounted on roof 11 of building 12 with conduits 13 and 14 connected in any convenient fashion to the equipment in the building, with the connections not shown. Thus, for example, cold water may go into conduit 13 from the building 12 by means of a conventional pump or the like. The water flows along common manifold 13a and is distributed into panels 10. The water flows through panels 10, is heated by means of solar energy, is collected in common manifold 14a and flows into conduit 14. The heated water is then stored or utilized in a heat exchange system inside the building in a known manner. Naturally, if desired, the water flow may be reversed with the cold water entering via conduit 14 and collected via conduit 13. Alternatively, the solar heating unit of the present invention may be used or placed in any suitable environment, such as on the ground with suitable fasteners to prevent displacement by wind or gravity. The solar heating unit of the present invention may be used for residential heating purposes, such as in providing hot water in a residential environment. For example, three panels of the present invention having dimensions of 8 feet × 4 feet would efficiently supply an average household of four with hot water for home use. Alternatively, the solar panels of the present invention may be conveniently used for heating water for swimming pools or for preheating water for domestic gas or oil fired domestic hot water heaters. The fluid is preferably retained in a closed system with the water in the system heated in the solar unit and delivered into an insulated cistern or container so that the heated fluid may be stored up during sunshine for use on cool cloudy days or at night when the heating of the fluid in the panel will not be of sufficient degree to provide the desired heat at the point of use.

A thermostat not shown is desirably installed at the top of the solar heater and this thermostat may be set to turn on a circulating pump whenever the temperature reaches a predetermined reading. The pump will then pump the water through the system as generally outlined above.

Figure 2:
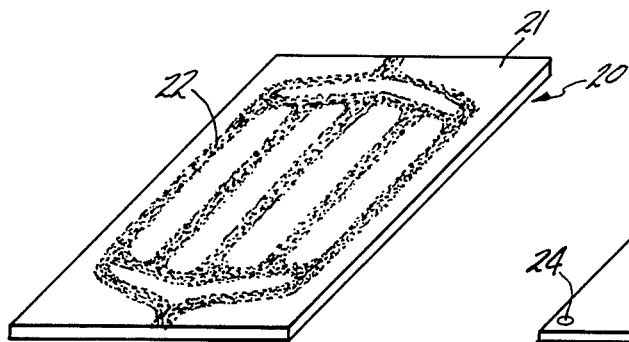
FIG. 2 is a perspective view of a sheet of metal having a pattern of weld-inhibiting material applied to a surface thereof.
Figure 3:
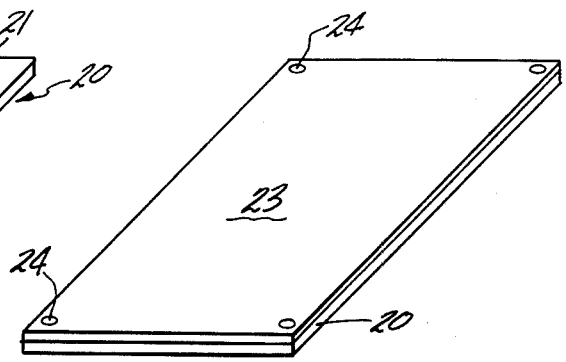
FIG. 3 is a perspective view of a composite metal blank wherein a second sheet of metal is superimposed on the sheet of metal shown in FIG. 2 with the pattern of weld-inhibiting material sandwiched therebetween.
Figure 4:
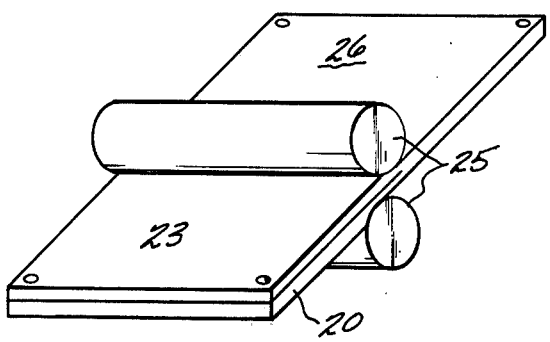
FIG. 4 is a schematic perspective view showing the sheets of FIG. 3 being welded together while passing through a pair of mill rolls.

As indicated above, the present invention contemplates a particularly preferred panel design for optimum efficiency in a solar heating system as described above. The metal panel or plate of the present invention is desirably fabricated by the ROLL-BOND ® process as shown in U.S. Pat. No. 2,690,002. FIG. 2 illustrates a single sheet of metal 20 as aluminum or copper or alloys thereof, having applied to a clean surface 21 thereof a pattern of weld-inhibiting material 22 corresponding to the ultimate desired passageway system. FIG. 3 shows the sheet 20 having superimposed thereon a second sheet 23 with a pattern of weld-inhibiting material 22 sandwiched between the units. The units 20 and 23 are tacked together as by support welds 24 to prevent relative movement between the sheets as they are subsequently welded together as shown in FIG. 4 by passing through a pair of mill rolls 25 to form welded blank 26. It is normally necessary that the sheets 20 and 23 be heated prior to passing through the mill rolls to assure that they weld to each other in keeping with techniques well known in the rolling art.

Figure 5:
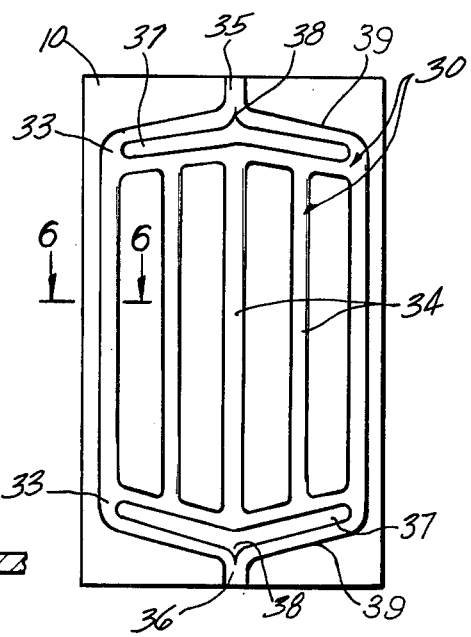
FIG. 5 is a top view showing the panel of the present invention having internal tubular passageways disposed between spaced apart portions of the thickness of the panel in the areas of the weld-inhibiting material.
Figure 7:
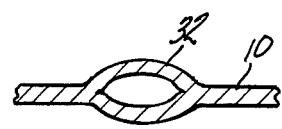
FIG. 7 is an alternate view showing a variation in the tube configuration similar to the view of FIG. 6.
Figure 6:
FIG. 6 is a sectional view taken along lines 6—6 of FIG. 5.

The resultant blank 26 is characterized by the sheets 20 and 23 being welded together except at the area of the weld-inhibiting material 22. The blank 26 with the unjoined inner portion corresponding to the pattern of weld-inhibiting material 22 may then be softened in any appropriate manner as by annealing, and thereafter the blank may be cold rolled to provide a more even thickness and again annealed. The portions of the panel adjacent the weld-inhibiting material 22 are then inflated by the introduction of fluid distending pressure, such as with air or water, in a manner known in the art to form a system of internal tubular passageways 30 corresponding to the pattern of weld-inhibiting material as shown in FIG. 5. The passageways 30 extend internally within panel 10 and are disposed between spaced apart portions of the thickness of said panel. Thus, panel 10 comprises a hollow sheet metal panel or plate having a system of fluid passageways 30 for a heat exchange medium extending internally therein. If the passageways are inflated by the introduction of fluid distending pressure between flat die platens, the resultant passageways have a flat topped configuration 31 as shown in FIG. 6. If, on the other hand, passageways 30 are formed without the presence of superimposed platens, the resultant passageway configuration has a semicircular shape 32 as shown in FIG. 7.

As shown in FIG. 5, the passageways 30 include opposed headers 33 connected by connecting portions 34 of said passageways extending substantially longitudinally in panel 10 between headers 33 and interconnecting same, with the opposed headers 33 extending in a direction substantially transverse to said longitudinal passageways. Preferably, opposed headers 33 are connected by a plurality of spaced, parallel individual connecting portions 34 of said passageways extending between the headers. Also passageways 30 include entry and exit portion 36 extending from headers 33 to provide ingress and egress openings for the heat exchange medium.

In accordance with the present invention as illustrated in FIG. 5, the headers 33 are provided with a fluid distributing pattern comprising a bonded portion 37 which defines at least one point along its perimeter a wedge-shaped projection 38 which assists in the distribution of flow of the heat exchange medium. Projections 38 are respectively located adjacent and in juxtaposition to entry portion 35 and exit portion 36 in FIG. 5 as an illustration of one of the features of the invention. The positioning of projection 38 particularly with respect to entry portion 35 facilitates the proportionate division of the incoming stream of fluid into two discrete fluid channels. Further, the provision of bonded portion 37 serves to maintain each channel under a uniform pressure which overcomes the aforenoted problem of pressure drop. Fluid thus leaving the area of header 33 is permitted to flow evenly and rapidly into respective connecting portions 34. Likewise, the provision of bonded portion 37 near exit portion 36 prevents the development of pressure drop as the fluid medium reaches the opposite end of panel 10.

In a preferred embodiment of the present invention, panel 10 is provided with headers 33 possessing outer edges or boundaries 39 defining the perimeter of the header, which are inclined with respect to the direction of fluid flow as defined by the central axes of the respective entry and exit portions not shown, which can be visualized as extending toward boundaries 39 to interest therewith to define external angles of at least 91° thereto, and preferably 92° to 100°, in accordance with our co-pending application Ser. No. 573,953 incorporated herein by reference. In the panels of this embodiment, the point of intersection between the respective central axis and the boundary within the entry or exit portion likewise comprises the apex of the perimeter defined by the boundary or outer edge of the header. The angle is measured within the plane containing the panel, and as thus defined is external in that it opens in the direction of the outer edge of the panel. Though this disposition of the headers of the present invention is preferred and is illustrated herein, it is not obligatory and does not form a limitation on the scope of the present invention, as headers may be employed which are at right angles to said direction of flow. The primary feature of the present invention is rather the disposition of the bonded portions within the headers of the present invention including the provision of at least one wedge-shaped projection to improve fluid distribution and flow.

Figure 8:
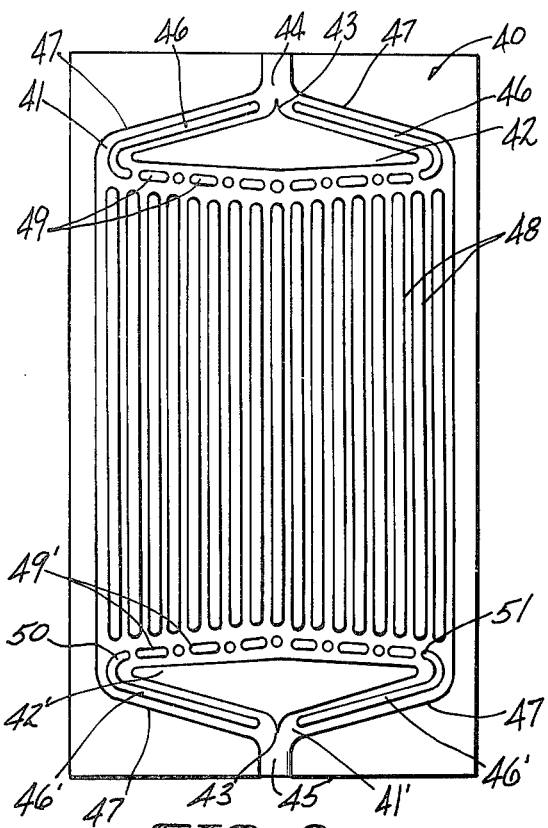
FIG. 8 is a top view showing an alternate embodiment of the present invention.

As can be appreciated, the present invention is broadly applicable in a wide variety of designs to suit the application of the panel. Thus, for example, FIG. 8 depicts a panel 40 which employs a header 41 comprising a series of bonded portions to provide desired fluid distribution. Primary bonded portion 42 comprises a wing-shaped expanse extending substantially the width of header 41 which defines a projection 43 located adjacent and in juxtaposition to entry portion 44. Corresponding bonded portion 42' is located adjacent exit portion 45 and defines projection 43' located in juxtaposition thereto.

In addition to primary bonded portion 42, the panel illustrated in FIG. 8 also defines secondary bonded portions 46 comprising two substantially J-shaped structures located annularly adjacent bounded portion 42 and between bonded portion 42 and the outer boundary 47 of header 41. Portions 46 provide further fluid channel division and thereby assist in the lateral distribution of fluid from header 41 to connecting portions 48. Additional bonded portions 49 are provided adjacent the entrances to connecting portions 48 to further assist in said lateral flow distribution. All of the above-noted bonded portions described with reference to header 41 adjacent entry portion 44 are also provided adjacent exit portion 45, and are labeled with the corresponding prime numbers. The bonded portions adjacent exit portion 45 define two structures serving in the same capacity as projection 43. Thus, projections 50 and 51 extending from J-shaped bonded portions 46' serve to split the flow of fluid exiting from connecting portions 48 into two subchannels which are reunited as they enter exit portion 45. Projections 50 and 51 thus perform a similar function to that of projection 43 discussed above.

Figure 9:
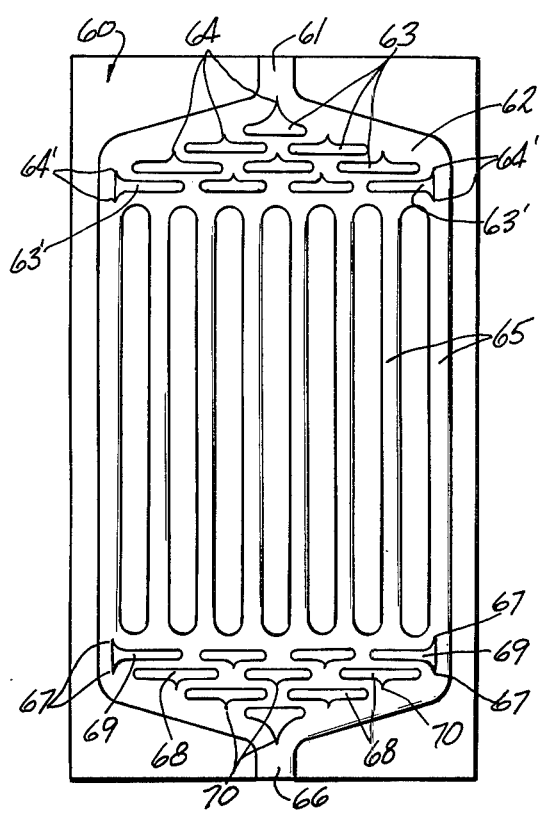
FIGS. 9, 10 and 11 are top views showing alternate embodiments of the present invention employing a plurality of bonded portions and wedge-shaped projections. de

An alternate embodiment of the present invention illustrated in FIG. 9 comprises the provision of a plurality of bonded portions and wedge-shaped projections provided in a descending or cascading arrangement. Thus, fluid entering panel 60 at entry portion 61 passes into header 62 which is provided with fluid distributing pattern comprising a series of cascading bonded portions 63 arranged in symmetrical rows of increasing lateral size. Each of the bonded portions 63 defines at least one projection 64 which serves to subdivide the incoming fluid into a plurality of substreams which pass between the respective bonded portions. Lateral-most bonded portions 63' adjacent connecting portions 65 are provided with a pair of projections 64'. Projections 64' are provided as illustrated to facilitate the function of bonded portions 63' as fluid distributing structures in the event that panel 60 is employed in a position 180° away from the illustration of FIG. 9. Naturally, the corresponding structures are illustrated adjacent exit portion 66. Thus, the function of projections 67 which are directed toward connecting portions 65 becomes readily apparent. Fluid exiting the connecting portions is thus channeled toward the spaces defined between bonded portions 68 and lateralmost bonded portions 69. Projections 70 defined on bonded portions 68 assist in further defining the various substreams passing between bonded portions and reuniting adjacent exit portion 66.

Figure 10:
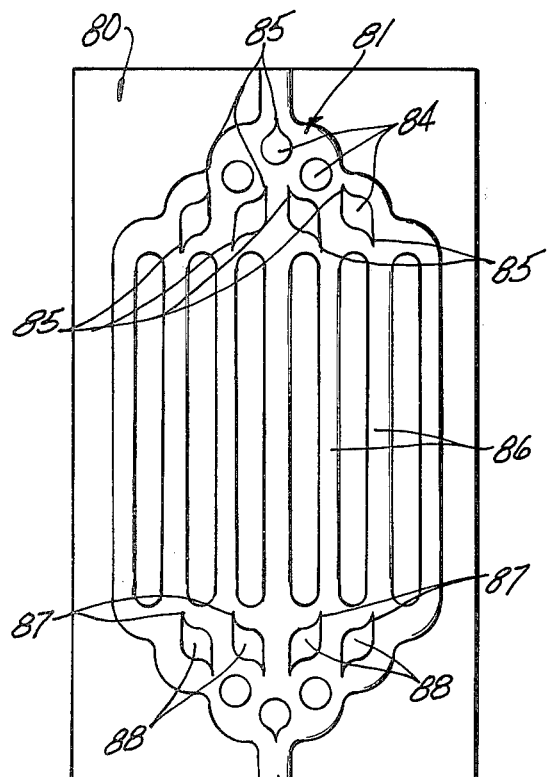

FIG. 10 illustrates a further variation in the panel design of the present invention, wherein panel 80 possesses a header 81 of scalloped configuration. As with the previous illustration, header 81 defines an external angle of at least 91° with respect to the direction of fluid flow determined with respect to the central axes of entry portion 82 and exit portion 83, though said angle is recognized not to comprise an essential feature of the present invention. The fluid distribution pattern defined within headers 81 comprises a series of progressively laterally displaced rounded bonded portions 84 which are arranged in a cascading relationship in a manner similar to FIG. 9. In the present figure, three rows of such bonded portions are illustrated, and the first and third rows are provided with projections 85 on each of said portions 84. Centrally located bonded portion 84 adjacent and in juxtaposition to entry portion 82 is provided with projections 85 serving to split incoming fluid into two distinct streams. Bonded portions 84 located adjacent connecting portions 86 are provided with a pair of diametrically displaced projections 85. The set of projections adjacent connecting portions 86 serve in a similar capacity to projections 67 of FIG. 9, as fluid exiting from connecting portions 86 is split into substreams by projections 87 provided on bonded portions 88 located nearby exit portion 83. The provision of paired projections on each of the bonded portions adjacent connecting portions 86 facilitates the employment of panel 80 in a position 180° removed from that illustrated in FIG. 10, in the same manner as the panel of FIG. 9.

Figure 11:
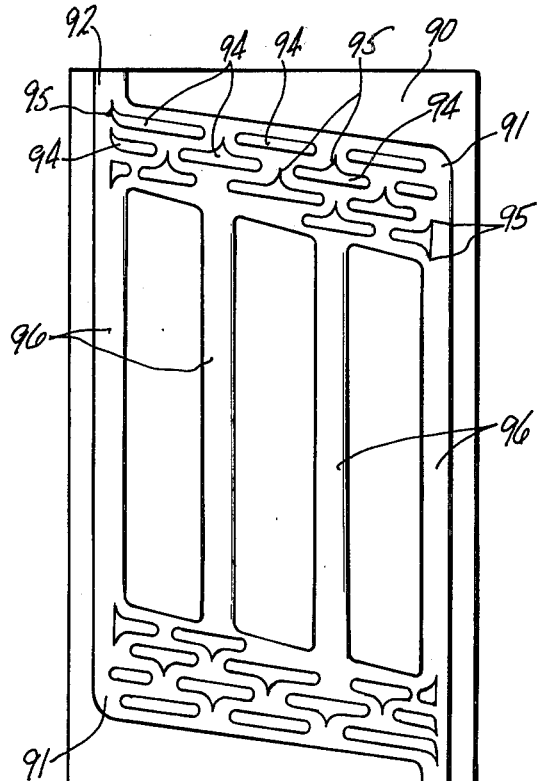

FIG. 11 illustrates an alternate embodiment of the present invention, wherein entry and exit portions are provided which extend from opposite ends of opposed headers. Thus, panel 90 is provided with headers 91 communicating with respective entry portion 92 and exit portion 93 extending from opposite ends thereof to the edges of the panel. Headers 91 are provided with a plurality of bonded portions 94 situated in lateral alignment in a plurality of rows. Certain of the bonded portions 94 are provided with projections 95, particularly those bonded portions located most nearly adjacent the respective entry and exit portions. In the manner similar to illustrations of FIGS. 9 and 10, certain bonded portions 94 located adjacent connecting portions 96 are provided with paired projections 95 serving to direct fluid issuing from said connecting portions, thereby further distributing and diminishing any pressure differentials encountered within the headers. Though not illustrated in FIG. 11, the present invention contemplates the provision of connecting portions disposed at an angle of at least 1° with respect to the direction of fluid flow defined in relation to the central axes of the respective exit and entry portions, of the panel as with respect to FIG. 5 discussed above, the central axes can be visualized as extending in the direction of connecting portions 96, whereby an intersection with one of said connecting portions provides the definition of the aforenoted angle. This particular feature is disclosed in our co-pending application Ser. No. 632,502, filed concurrently herewith, the disclosure of which is incorporated herein by reference.

Naturally, several alternative designs may be envisioned by one skilled in the art in accordance with the concepts described above.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A metal panel for use in a solar energy collector system having a desired system of internal tubular passageways for a heat exchange medium disposed between spaced apart portions of the thickness of said panel and defining opposed headers connected by a plurality of spaced, parallel individual connecting portions of said passageways extending therebetween, with at least one first bonded portion of said metal defining said connecting portions, said passageways having entry and exit portions extending from said headers to opposed edges of said panel to provide ingress and egress openings for said heat exchange medium, wherein said headers each include a fluid distributing pattern comprising at least one second bonded portion, of said metal in said headers spaced from said first bonded portion, each of said second bonded portions defining at least one wedge-shaped projection adjacent and in juxtaposition to said entry and exit portions, respectively, said projections provided to assist in the distribution of flow of said heat exchange medium and to subdivide said flow into discrete channels.

2. The panel of claim 1 wherein said entry portion and said exit portion extend from the opposite sides of respective opposed headers.

3. The panel of claim 1 wherein each of said entry and exit portions has a central axis, and said headers possess outer boundaries defining the perimeter thereof, and at least one of said boundaries lying adjacent the apex of said perimeter defines an external angle of at least 91° with respect to the central axis of the adjacent entry or exit portion with which it intersects, and said angle is taken in the plane containing said panel.

4. The panel of claim 3 wherein said angle ranges from 92° to 100°.

5. The panel of claim 1 wherein said pattern comprises a plurality of said second bonded portions.

6. The panel of claim 5 wherein a plurality of wedge-shaped projections are defined by said second bonded portions.

7. The panel of claim 6 wherein said second bonded portions are provided in a cascading arrangement.

* * * * *